(12) United States Patent
Hirt

(10) Patent No.: US 8,288,990 B2
(45) Date of Patent: Oct. 16, 2012

(54) ENERGY-TRANSMITTING DEVICE FOR A HANDHELD POWER TOOL OR THE LIKE, HAVING A MOVABLY SUPPORTED PIN CONTACT ELEMENT

(75) Inventor: Daniel Hirt, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 12/638,401

(22) Filed: Dec. 15, 2009

(65) Prior Publication Data
US 2010/0148725 A1 Jun. 17, 2010

(30) Foreign Application Priority Data
Dec. 15, 2008 (DE) .......................... 10 2008 054 639

(51) Int. Cl.
*H01M 10/46* (2006.01)
(52) U.S. Cl. ........................................ 320/114
(58) Field of Classification Search .................. 320/106, 320/107, 110, 114, 115, 116
See application file for complete search history.

(56) References Cited

U.S. PATENT DOCUMENTS

| 5,089,738 A | 2/1992 | Bergqvist et al. |
| 5,769,657 A | 6/1998 | Kondo et al. |
| 6,384,575 B1* | 5/2002 | Chen et al. ..................... 320/110 |
| 2006/0103347 A1* | 5/2006 | Shum ............................. 320/110 |
| 2008/0185992 A1* | 8/2008 | Hoffman et al. .............. 320/110 |

FOREIGN PATENT DOCUMENTS
JP 2001179661 A 7/2001
* cited by examiner

*Primary Examiner* — Edward Tso
(74) *Attorney, Agent, or Firm* — Kenyon & Kenyon LLP

(57) ABSTRACT

The invention relates to an energy-transmitting device, for transmitting electrical energy between a handheld power tool and/or a battery unit and/or a charging unit. The energy-transmitting device has at least one pin contact element. It is proposed that the pin contact element is movably supported.

19 Claims, 5 Drawing Sheets

ENERGY-TRANSMITTING DEVICE FOR A HANDHELD POWER TOOL OR THE LIKE, HAVING A MOVABLY SUPPORTED PIN CONTACT ELEMENT

CROSS-REFERENCE TO RELATED APPLICATION

This application is based on German Patent Application 10 2008 054 639.9 filed Dec. 15, 2008.

BACKGROUND OF THE INVENTION

1. Field of the Invention

The invention is based on an energy-transmitting device.

2. Background of the Invention

It has already been proposed that an energy-transmitting device for transmitting electrical energy between a handheld power tool and/or a battery unit and/or a charging unit be embodied with a pin contact element.

ADVANTAGES AND SUMMARY OF THE INVENTION

The invention is based on an energy-transmitting device that is intended for transmitting electrical energy between a handheld power tool and/or a battery unit and/or a charging unit, having at least one pin contact element.

It is proposed that the pin contact element is movably supported. In this context, the word "intended" should be understood in particular to mean especially equipped and/or especially designed. The term "pin contact element" should be understood here in particular to mean an element and/or component, in particular an element and/or component embodied as a plug of a plug-and-socket connection or as a pin of a pin-and-socket connection and that is intended for transmitting and/or exchanging electrical energy by means of a contact with a further element and/or component, in particular an outlet of a plug-and-socket connection or a socket of a pin-and-socket connection. Preferably, the pin contact element is made from copper. However, it is conceivable to form the pin contact element from some other material that appears useful to one skilled in the art. The term "movably supported" is meant here to define in particular a support of an element and/or component by means of at least one further element and/or component, in particular a bearing element, and the bearing is embodied such that the element and/or component can execute a motion in at least one direction, in particular an additional motion to an intrinsic elasticity. By means of the embodiment of the energy-transmitting device according to the invention, positioning errors intrinsic in the assembly and manufacture of the pin contact element upon connection to a corresponding counterpart contact, in particular to a contact spring and/or contact cup, and/or relative to a housing, can advantageously be compensated for. The tolerance ranges to be adhered to in manufacture can be selected to be wide, since deviations can be compensated for by the movably supported pin contact element, making economies in both cost and manufacture possible.

It is also proposed that the pin contact element is embodied in platelike fashion. The term "platelike" should be understood in particular to mean a three-dimensional shape of an element and/or component that has two essentially plane primary extension faces, which extend essentially parallel to one another and are connected to one another by secondary faces extending essentially perpendicular to both primary extension faces. Preferably, the primary extension face has a length that extends essentially perpendicular to at least one secondary face and which in its dimension forms a multiple of a shortest possible spacing between the parallel-extending primary extension faces of the pin contact element; in particular, the primary extension face has a five-fold longitudinal elongation, preferably a ten-fold longitudinal elongation, and especially preferably a twenty-fold longitudinal elongation of the spacing. The term "essentially parallel" should be understood here to mean in particular a direction which compared to a reference direction has a deviation that is in particular less than 15°, advantageously less than 8°, and especially advantageously less than 3°. The term "essentially perpendicular" should be understood here to mean in particular a direction that is at an angle of 90° relative to a reference direction and has a deviation that in particular is less than 15°, advantageously less than 8°, and especially advantageously less than 3°. By means of a platelike shape, a large contact area of the pin contact element for transmitting and/or exchanging electrical energy can especially advantageously be attained, and contact between the pin contact element and a counterpart contact can be established structurally simply.

Preferably, the pin contact element is movably supported in at least one direction oriented essentially perpendicular to a primary extension face of the pin contact element. The term "direction oriented essentially perpendicular" should be understood here in particular to mean a direction which extends essentially perpendicular to a primary extension face and/or essentially parallel to the secondary faces of the platelike pin contact element. However, it is also conceivable that the pin contact element is movably supported in at least one further direction that appears useful to one skilled in the art. By means of the embodiment according to the invention, freedom of motion of the pin contact element for compensating for positioning errors upon connection of the pin contact element to a corresponding contact element, especially contact springs and/or contact cups, can be attained especially advantageously and structurally simply.

It is furthermore proposed that the energy-transmitting device has at least two pin contact elements which are movable relative to one another. The at least two pin contact elements are embodied as essentially structurally identical to one another, so that economies in manufacturing costs can advantageously be achieved. Moreover, by means of the movable support of the two pin contact elements relative to one another, gentle treatment of components of the energy-transmitting device that are in direct contact with the pin contact elements can advantageously be attained. Preferably, by means of the motion of the pin contact elements relative to one another, the components are exposed to only slight loads, and in particular only slight internal stresses that can occur upon a connection of the pin contact elements to corresponding contact elements, in particular contact springs and/or contact cups.

Advantageously, the energy-transmitting device has at least two bearing elements, which are intended for at least partially receiving at least two pin contact elements. The term "bearing elements" here in particular defines elements and/or components that are intended for absorbing and/or diverting forces, in particular forces that act on the pin contact elements and/or are intended for limiting and/or enabling a motion, in particular a motion of the pin contact elements. Preferably, the bearing elements receive the pin contact elements at least partially on at least two sides and surround them on at least two sides. The pin contact elements are preferably joined to the bearing elements by a gun spraying method. However, it is conceivable to connect to the pin contact elements to the bearing elements in some other way that appears useful to one skilled in the art. As a result, an especially secure connection can be achieved between the pin contact elements and the bearing elements, in particular upon a motion of the pin contact elements together with the bearing elements, and further a structurally simple and economical support of the pin contact elements can be achieved.

It is furthermore proposed that the bearing elements, together with at least two pin contact elements, form a structural unit. The term "structural unit" should be understood here to mean in particular an assembly unit that is a self-contained unit comprising two or more individual parts and/or structural units of lower order; an individual part is preferably an element that cannot be broken down. Preferably, a structural unit forms a component of the system that is especially relevant for at least one function of the entire system. Easy and convenient replaceability can be assured by means of the arrangement of the bearing elements and pin contact elements to make a structural unit. Moreover, fewer additional components are needed, and economies in terms of installation space, assembly effort, and expense are possible.

A handheld power tool having an energy-transmitting device according to the invention is proposed as well. The handheld power tool has a housing in which the pin contact element of the energy-transmitting device is at least partially disposed. Preferably, the pin contact element is disposed in a coupling region. The term "coupling region" should be understood here to mean in particular a region of the handheld power tool that is intended for receiving an element and/or component and/or for coupling and/or connecting the element and/or component to the handheld power tool, in particular for supplying the handheld power tool with electrical energy, especially in cordless fashion. Embodying the handheld power tool according to the invention advantageously makes it possible to compensate for positioning errors, made in assembly and manufacture, of the pin contact element upon connection to a corresponding counterpart contact, especially a contact spring and/or contact cup of a battery unit, in particular a rechargeable battery pack unit.

A battery unit with an energy-transmitting device of the invention is also proposed, and the battery unit has a housing in which the pin contact element of the energy-transmitting device is at least partially disposed. Preferably, the pin contact element is disposed in a coupling region. As a result, simple coupling of the battery unit to an electrical device, in particular a handheld power tool, that receives the battery unit can advantageously be achieved. Moreover, easy introduction of the battery unit into and or its coupling to the handheld power tool and/or a charging device can be assured.

A charging unit for transmitting electrical energy to a battery unit and having an energy-transmitting device is proposed as well. The charging unit has a housing in which the pin contact element of the energy-transmitting device is at least partially disposed. Preferably, the pin contact element is disposed in a coupling region.

BRIEF DESCRIPTION OF THE DRAWINGS

The invention will be better understood and further objects and advantages thereof will become more apparent from the ensuing detailed description of preferred embodiment taken in conjunction with the drawings, in which.

DESCRIPTION OF THE PREFERRED EMBODIMENTS

Figure 1:
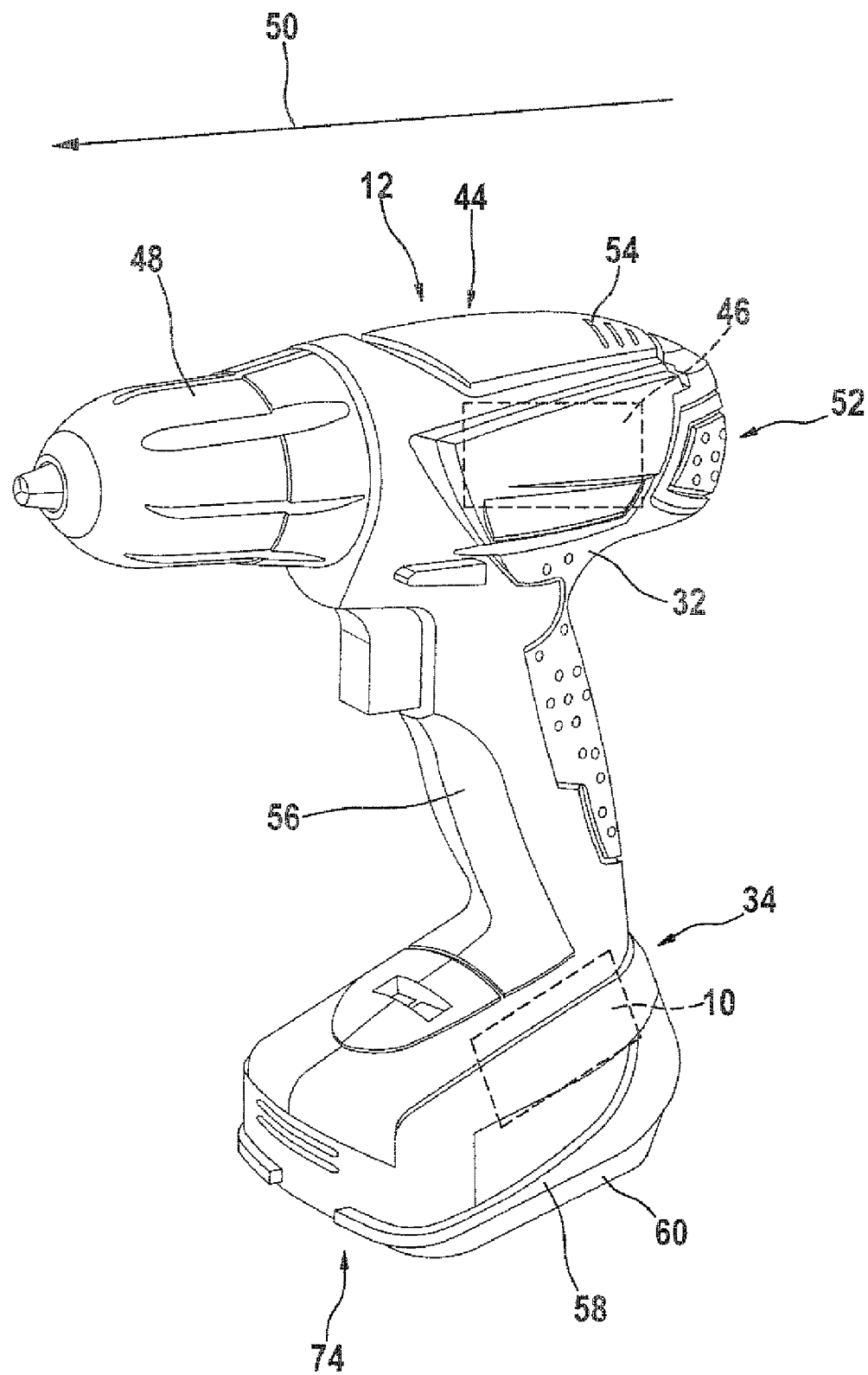
FIG. 1 shows a handheld power tool with an energy-transmitting device of the invention in a schematic illustration.
Figure 2:
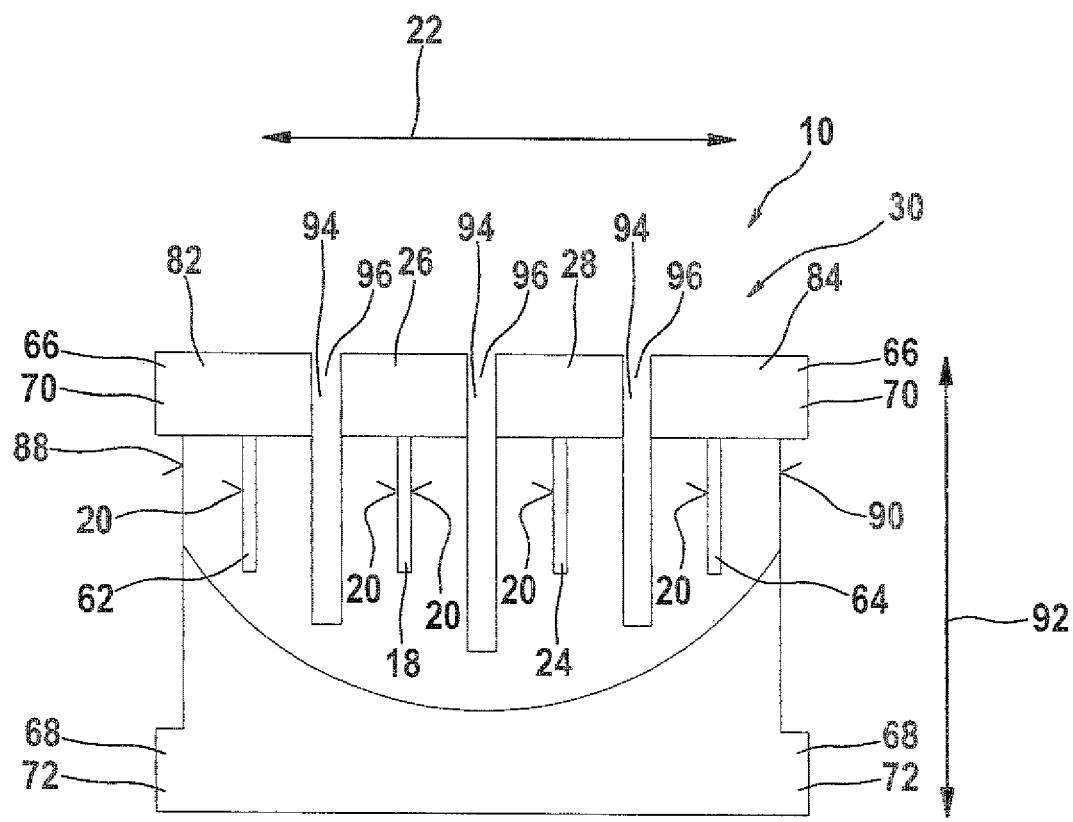
FIG. 2 shows an energy-transmitting device of the invention in a schematic top view.
Figure 3:
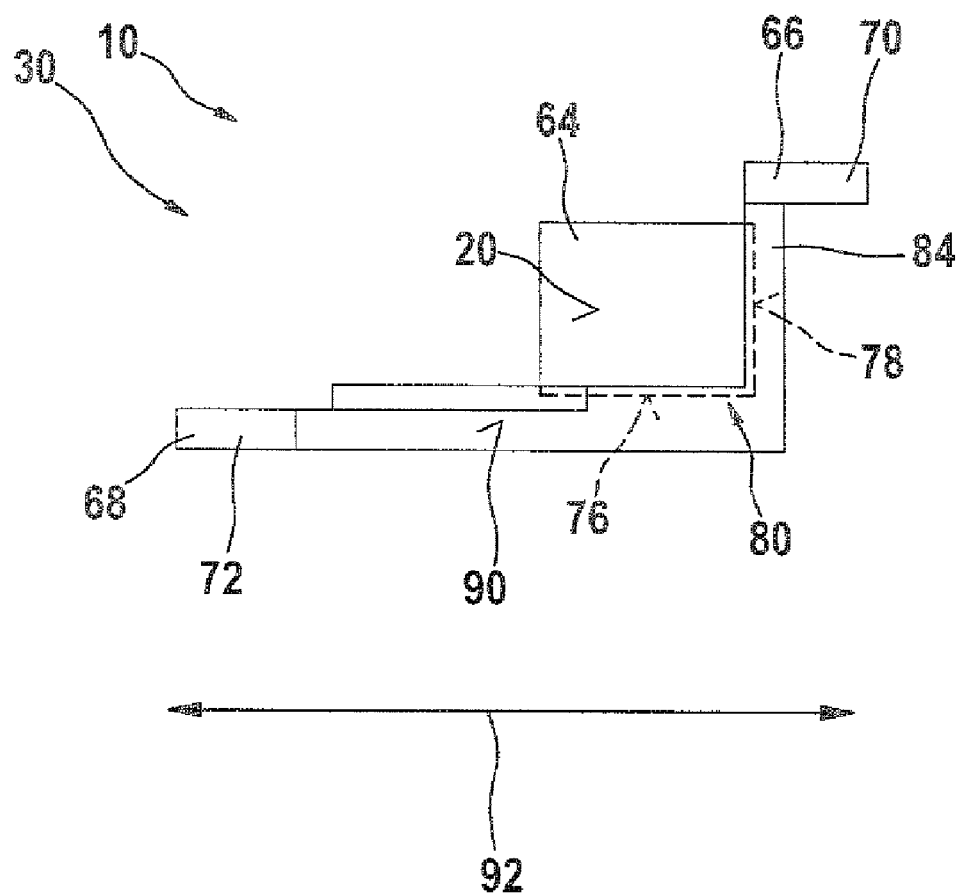
FIG. 3 shows an energy-transmitting device of the invention in a schematic side view.

FIG. 1 shows a handheld power tool 12, embodied as a cordless screwdriver 44, having an energy-transmitting device 10 of the invention in a schematic illustration. The cordless screwdriver 44 includes a multiple-part housing 32, which surrounds the energy-transmitting device 10 and a motor unit 46 of the cordless screwdriver 44. The cordless screwdriver 44 further includes a tool receptacle 48, into which a tool (not shown in further detail here) can be inserted. A primary extension direction 50 of the cordless screwdriver 44 extends from one side 52 of the housing 32, on which cooling openings 54 are disposed, in the direction of the tool receptacle 48. A handle 56 is disposed on the housing 32, essentially perpendicular to the primary extension direction 50, and is intended for guidance of the cordless screwdriver 44 by a user. The handle 56 is embodied in one piece with the housing 32. A battery unit 60 embodied as a rechargeable battery pack 58 is secured to a coupling region 34 on the handle 56 and is connected electrically to the cordless screwdriver 44, in particular to the motor unit 46, by means of the energy-transmitting device 10. To that end, a first pin contact element 18 of the energy-transmitting device 10 is at least partially disposed in the coupling region 34 of the housing 32 of the cordless screwdriver 44. The coupling region 34 is disposed on the handle 56 on a side 74 facing away from the motor unit 46 of the cordless screwdriver 44. A total of four pin contact elements 18, 24, 62, 64 for transmitting electrical energy are provided in the coupling region 34 of the housing 32 (FIG. 2). However, it is conceivable to dispose more than four pin contact elements 18, 24, 62, 64 in the coupling region 34. By means of four retention elements 70, 72 (FIGS. 2 and 3) embodied as extensions 66, 68, the energy-transmitting device 10 is supported in the housing 32 in two receiving elements (not shown in further detail here) embodied as pockets. The rechargeable battery pack 58, for electrical connection to the cordless screwdriver 44, has electrical contacts (not shown in further detail here), which are embodied as counterparts to the pin contact elements 18, 24, 62, 64.

FIG. 2 shows an energy-transmitting device 10 of the invention in a top view. The energy-transmitting device 10 is intended for transmitting electrical energy between a handheld power tool and/or a battery unit and/or a charging unit. In this exemplary embodiment, the construction of the energy-transmitting device 10 for transmitting electrical energy between the cordless screwdriver 44 and the rechargeable battery pack 58 is described. For transmitting electrical energy, the energy-transmitting device 10 has a pin contact element 18, which is movably supported. The energy-transmitting device 10 has a total of four pin contact elements 18, 24, 62, 64; that is, a first, second, third, and fourth pin contact element 18, 24, 62, 64. The pin contact elements 18, 24, 62, 64 are embodied in platelike fashion, in order to form a large surface area for transmitting the electrical energy upon an electrical connection to corresponding contact elements, in particular contact springs and/or contact cups, of the rechargeable battery pack 58.

The first pin contact element 18 is movably supported in a direction 22 oriented essentially perpendicular to a primary extension face 20 of the first pin contact element 18. The primary extension face 20 of the first pin contact element 18 is formed here by a face of the first pin contact element 18 that has the largest surface area. The primary extension face 20 of the second, third and fourth pin contact elements 24, 62, 64 is formed analogously to the first pin contact element 18 by one face each of the various pin contact elements 24, 62, 64. The primary extension faces 20 of the pin contact elements 18, 24, 62, 64 are disposed essentially parallel to one another. The second pin contact element 24 is supported movably relative to the first pin contact element 18. As a result of such an arrangement, the second pin contact element 24 can execute a motion, in the direction 22 perpendicular to the primary extension face 20 of the first pin contact element 18, that is essentially independent of the first pin contact element 18.

In an alternative feature of the invention, it is conceivable, depending on the field in which it is used, to dispose all four pin contact elements 18, 24, 62, 64 as movable relative to one another. In that case the third and fourth pin contact elements 62, 64 can likewise be movably supported in the direction 22 that extends essentially perpendicular to the primary extension faces 20 of the pin contact elements 18, 24, 62, 64.

For movably supporting the first and second pin contact elements 18, 24, the energy-transmitting device 10 includes two bearing elements 26, 28, which are intended for partially receiving the first and second pin contact elements 18, 24. To that end, the pin contact elements 18, 24 are connected to the bearing elements 26, 28 by means of a gun spraying operation. However, it is conceivable to connect the pin contact elements 18, 24 to the bearing elements 26, 28 in some other way that appears useful to one skilled in the art. The bearing elements 26, 28 are embodied as essentially L-shaped (see FIG. 3). The pin contact elements 18, 24 are spray-coated from two sides. The pin contact elements 18, 24 are each connected to the respective bearing element 26, 28 by the gun spraying operation in such a way that two secondary faces 76, 78 of the first and second pin contact elements 18, 24 are each essentially completely surrounded by the respective bearing element 26, 28. The secondary faces 76, 78 of the respective pin contact element 18, 24 are disposed perpendicular to the primary extension face 20 of the pin contact element 18, 24, and furthermore the secondary faces 76, 78 are each disposed perpendicular to one another, and in addition to the secondary faces 76, 78, an L-shaped peripheral region 80 of the primary extension faces 20 of the pin contact elements 18, 24 is spray-coated as well. The two bearing elements 26, 28, together with the first and the second pin contact element 18, 24, are disposed movably relative to one another. Furthermore, two further bearing elements 82, 84 are provided, which partly receive the third and the fourth pin contact element 62, 64, respectively. The third and the fourth pin contact element 62, 64 are connected to the further two bearing elements 82, 84. The connection of the third and fourth pin contact elements 62, 64 is done in a manner corresponding to the connection of the first and second pin contact elements 18, 24 to the two bearing elements 26, 28. Alternatively or in addition, it is moreover conceivable for the two further bearing elements 82, 84 to be disposed movably relative to the respective two bearing elements 26, 28 of the first and second pin contact elements 18, 24.

The total of four bearing elements 26, 28, 82, 84, together with the first, second, third and fourth pin contact elements 18, 24, 62, 64, form a structural unit 30. The structural unit 30 may be embodied as an individual assembly unit, which can be built into the cordless screwdriver 44 as an independent and fully functional assembly unit, or the structural unit 30 may be embodied as a so-called lower-order structural unit and then is built into the cordless screwdriver 44 together with one or more lower-order structural units as a assembly unit.

The bearing elements 82, 84 of the third and fourth pin contact elements 62, 64 partially form an outside 88, 90 of the structural unit 30, in a direction 92 parallel to the primary extension face 20 of one of the pin contact elements 18, 24, 62, 64. The bearing elements 82, 84 of the third and fourth pin contact elements 62, 64 have the retention element 70, embodied as an extension 66, which extends in the direction 22 perpendicular to the primary extension face 20 of one of the pin contact elements 18, 24, 62, 64 and is intended for securing the energy-transmitting device 10 in the housing 32 of the cordless screwdriver 44. The receiving elements embodied as pockets in the housing 32 are embodied such that they correspond to and/or cooperate with the extensions 66 of the bearing elements 82, 84. Thus upon an assembly of the structural unit, a form lock is created between the extensions 66 of the bearing elements 82, 84 and the pockets in the housing 32 of the cordless screwdriver 44. The structural unit 30 furthermore has two further retention elements 72 (FIGS. 2 and 3), embodied as extensions 68, which are disposed offset, in the direction 92 parallel to the primary extension face 20 of one of the pin contact elements 18, 24, 62, 64, to the extensions 66 of the bearing elements 82, 84 of the third and fourth pin contact elements 62, 64. The two further extensions 68 are likewise intended for forming a form-locking connection with two further pockets (not shown in further detail here) disposed in the housing 32 of the cordless screwdriver 44.

The structural unit 30 furthermore includes spacer elements 94, which are disposed inside the structural unit 30 in the direction 22 perpendicular to the primary extension face 20 of one of the pin contact elements 18, 24, 62, 64. The spacer elements 94 are intended for movable support of the individual bearing elements 26, 28, 82, 84 together with the respective pin contact element 18, 24, 62, 64, with one spacer element 94 disposed between each two directly adjacent bearing elements 26, 28, 82, 84. However, it is conceivable for all the bearing elements 26, 28, 82, 84, together with the corresponding pin contact element 18, 24, 62, 64, to be surrounded by two spacer elements 94 in the direction 22, at a right angle to the primary extension direction of one of the pin contact elements 18, 24, 62, 64. The spacer elements 94, in this embodiment of the invention, are formed by recesses 96.

The recesses 96 are embodied in landlike fashion and extend in the shape of an L along the bearing elements 26, 28, 82, 84; a longitudinal elongation of the recesses 96 is disposed essentially parallel to a longitudinal elongation of the bearing elements 26, 28, 82, 84. However, it is conceivable for the spacer elements 94 to be embodied in some other form that appears useful to one skilled in the art and/or for the spacer elements to be formed by further components. The longitudinal elongations of the recesses 96 are defined by the dimension of the entire structural unit 30, specifically in that the longitudinal elongation of the recesses 96 is smaller than one dimension of the entire structural unit 30.

Figure 4:
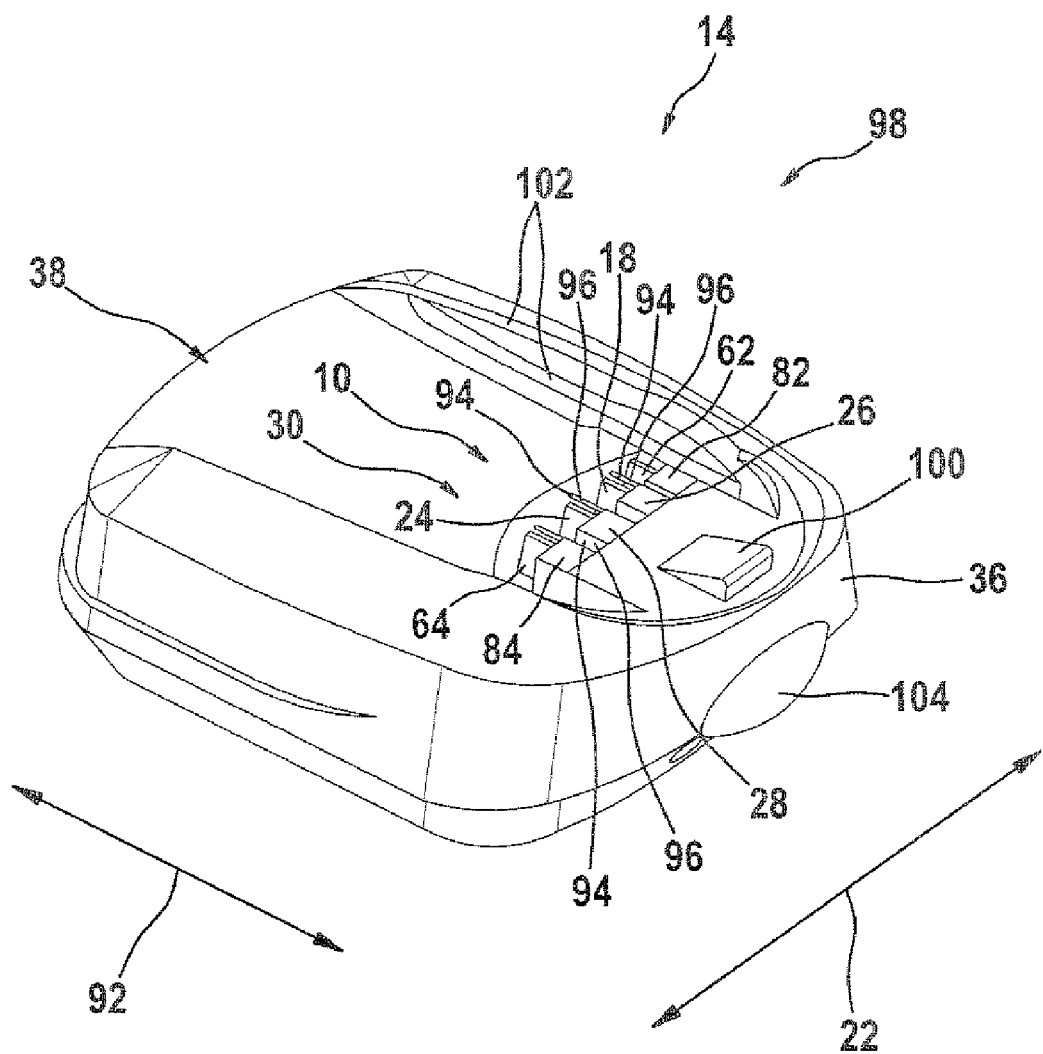
FIG. 4 shows a battery unit with an energy-transmitting device of the invention in a schematic illustration.
Figure 5:
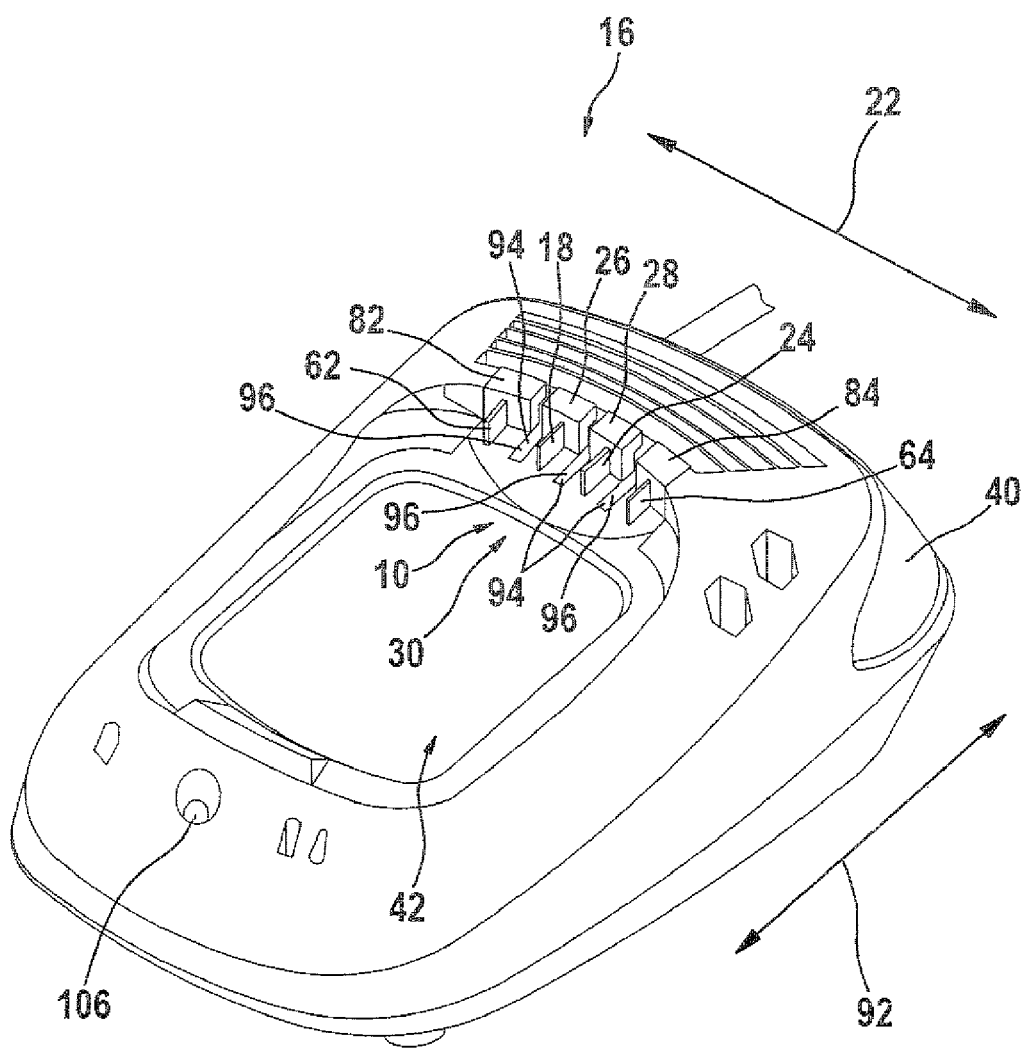
FIG. 5 shows a charging unit with an energy-transmitting device of the invention in a schematic illustration.

In FIGS. 4 and 5, alternative exemplary embodiments are shown. Components, characteristics and functions that remain essentially the same are all identified by the same reference numerals. The ensuing description is essentially limited to the differences from the exemplary embodiment in FIGS. 1-3; for components, characteristics and functions that remain the same, the description of the exemplary embodiment in FIGS. 1-3 can be referred to.

FIG. 4 shows a battery unit 14, embodied as a rechargeable battery pack 98, with an energy-transmitting device 10 of the invention in a schematic view. The energy-transmitting device 10 is intended for transmitting electrical energy between the rechargeable battery pack 98 and the handheld power tool and a charging unit. The rechargeable battery pack 98 includes a housing 36 with a coupling region 38, in which, for detachable fastening of the rechargeable battery pack 98 to the handheld power tool (not shown in further detail here), a locking element 100 and guide rails 102 are disposed. The locking element 100 can be actuated for unlocking by a user by means of an actuation element 104. The energy-transmitting device 10 of the rechargeable battery pack 98 is disposed in the coupling region 38 and is supported in the housing 36 of the rechargeable battery pack 98, in two receiving elements (not shown in further detail here) embodied as pockets, by means of four retention elements 70, 72 (see FIGS. 2 and 3) embodied as extensions 66, 68. For electrical connection, at least one first pin contact element 18 of the energy-transmitting device 10 is disposed in the coupling region 38 of the housing 36 of the rechargeable battery pack 98. A total of four pin contact elements 18, 24, 62, 64 for transmitting electrical energy are provided in the coupling region 38 of the housing 36. However, it is conceivable to dispose more than four pin contact elements 18, 24, 62, 64 in the coupling region 38. The handheld power tool or charging unit that is intended for coupling to the rechargeable battery pack 98 includes electrical contacts (not shown in further detail here), which are embodied as counterparts to the pin contact elements 18, 24, 62, 64.

FIG. 5 shows a charging unit 16 with an energy-transmitting device 10 of the invention in a schematic view. The energy-transmitting device 10 is intended for transmitting electrical energy between the charging unit 16 and a battery unit or a handheld power tool. The charging unit 16 includes a housing 40 with a coupling region 42 for receiving a battery unit (not shown in further detail here) embodied as a rechargeable battery pack. LEDs 106 for displaying the charge status are also disposed in the housing 40. The energy-transmitting device 10 of the charging unit 16 is disposed in the coupling region 42 and supported in the housing 40 of the charging unit 16, in two receiving elements (not shown in further detail here) embodied as pockets, by means of four retention elements 70, 72 (see FIGS. 2 and 3) embodied as extensions 66, 68. For electrically connecting the charging unit 16 to the rechargeable battery pack, at least one first pin contact element 18 of the energy-transmitting device 10 is disposed in the coupling region 42 of the housing 40 of the charging unit 16. In the coupling region 42 of the housing 40, a total of four pin contact elements 18, 24, 62, 64 are provided for transmitting electrical energy. However, it is conceivable to dispose more than four pin contact elements 18, 24, 62, 64 in the coupling region 42. The rechargeable battery pack connected to the charging unit 16 for charging includes electrical contacts (not shown in further detail here), which are embodied as counterparts to the pin contact elements 18, 24, 62, 64.

The foregoing relates to preferred exemplary embodiments of the invention, it being understood that other variants and embodiments thereof are possible within the spirit and scope of the invention, the latter being defined by the appended claims.

I claim:

1. An energy-transmitting device, transmitting electrical energy between a handheld power tool and a battery unit or between a battery unit and a battery charging unit for the battery unit, the energy-transmitting device having at least one pin contact element, which is movably supported, the pin contact element being embodied as a plate having two primary extension faces which extend essentially parallel to one another, wherein the pin contact element is movably supported in a direction essentially perpendicular to the two primary extension faces.

2. The energy-transmitting device as defined by claim 1, including at least two pin contact elements, which are supported movably relative to one another.

3. The energy-transmitting device as defined by claim 2, including at least two bearing elements at least partially receiving at least two pin contact elements.

4. The energy-transmitting device as defined by claim 3, wherein the bearing elements, together with at least two pin contact elements, form a structural unit.

5. A handheld power tool having an energy-transmitting device as defined by claim 1.

6. The handheld power tool as defined by claim 5, having a housing in which the pin contact element of the energy-transmitting device is at least partially disposed.

7. A battery unit having an energy-transmitting device as defined by claim 1.

8. The battery unit as defined by claim 7, including a housing in which the pin contact element of the energy-transmitting device is at least partially disposed.

9. A charging unit for transmitting electrical energy to a battery unit, having an energy-transmitting device as defined by claim 1.

10. The charging unit as defined by claim 9, including a housing in which the pin contact element of the energy-transmitting device is at least partially disposed.

11. The energy-transmitting device as defined by claim 1, wherein at least four pin contact elements are provided.

12. The energy-transmitting device as defined by claim 3, wherein the at least two bearing elements are embodied essentially L-shaped.

13. The energy-transmitting device as defined by claim 3, wherein the at least one pin contact element is connected to at least one of the at least two bearing elements essentially by means of a gun spraying operation.

14. The energy-transmitting device as defined by claim 4, wherein the structural unit includes at least one spacer element.

15. The energy-transmitting device as defined by claim 14, wherein the at least one spacer element is disposed in a direction perpendicular to the primary extension face of the pin contact element.

16. The energy-transmitting device as defined by claim 14, wherein the at least one spacer element is intended for movable support of the at least one bearing element together with the pin contact element.

17. The energy-transmitting device as defined by claim 14, wherein the at least one spacer element is disposed between two directly adjacent bearing elements.

18. The energy-transmitting device as defined by claim 14, wherein the at least one spacer element is formed essentially by at least one recess.

19. An energy-transmitting device, transmitting electrical energy between a handheld power tool and a battery unit or between a battery unit and a battery charging unit for the battery unit, the energy-transmitting device having at least two pin contact elements, which are movably supported relative to one another, wherein at least two bearing elements are provided for at least partially receiving at least two pin contact elements.

* * * * *